(12) United States Patent
Remboski et al.

(10) Patent No.: US 11,563,359 B2
(45) Date of Patent: Jan. 24, 2023

(54) LUBRICANT SUPPORTED ELECTRIC MOTOR WITH A MOVABLE RACEWAY AND AN OPTIMIZED METHOD OF OPERATING SAME

(71) Applicant: Neapco Intellectual Property Holdings, LLC, Farmington Hills, MI (US)

(72) Inventors: Donald Remboski, Ann Arbor, MI (US); Jacqueline Dedo, Wolverine Lake, MI (US); Mark Versteyhe, Oostkamp (BE)

(73) Assignee: NEAPCO INTELLECTUAL PROPERTY HOLDINGS, LLC, Farmington Hills, MI (US)

(*) Notice: Subject to any disclaimer, the term of this patent is extended or adjusted under 35 U.S.C. 154(b) by 202 days.

(21) Appl. No.: 17/030,792

(22) Filed: Sep. 24, 2020

(65) Prior Publication Data

US 2021/0091637 A1 Mar. 25, 2021

Related U.S. Application Data

(60) Provisional application No. 62/905,487, filed on Sep. 25, 2019.

(51) Int. Cl.
*H02K 9/19* (2006.01)
*H02K 7/14* (2006.01)
(Continued)

(52) U.S. Cl.
CPC ............ *H02K 9/19* (2013.01); *F16H 57/0476* (2013.01); *H02K 7/118* (2013.01); *H02K 7/14* (2013.01);
(Continued)

(58) Field of Classification Search
CPC ... B21B 37/40; B60K 7/0007; B60Y 2200/91; B60Y 2306/03; B60Y 2410/102;
(Continued)

(56) References Cited

U.S. PATENT DOCUMENTS 3,072,300 A * 1/1963 Thomas .................. F16N 13/06
417/374
4,643,592 A 2/1987 Lewis et al.
4,784,295 A * 11/1988 Holmstrand .............. B05B 9/04
239/126
5,029,419 A * 7/1991 Nakayama .............. B24C 1/083
451/53

(Continued)

FOREIGN PATENT DOCUMENTS

CN 103089810 A * 5/2013
CN 103089810 A 5/2013
(Continued)

OTHER PUBLICATIONS

Search Report and Written Opinion regarding corresponding PCT App. No. PCT/US2020/052757; dated Dec. 14, 2020.

*Primary Examiner* — Naishadh N Desai
(74) *Attorney, Agent, or Firm* — Dickinson Wright PLLC

(57) ABSTRACT

A lubricant supported electric motor includes a stator presenting an outer raceway and a rotor extending along an axis and rotatably disposed within the stator. The rotor presents an inner raceway disposed in spaced relationship with the outer raceway to define a gap therebetween, and a lubricant is disposed in the gap for supporting the rotor within the stator. At least one of the outer raceway or the inner raceway is movable radially towards or away from the other to adjust the gap and optimize operation of the lubricant supported electric motor.

14 Claims, 1 Drawing Sheet

(51) Int. Cl.
 *F16H 57/04* (2010.01)
 *H02K 7/118* (2006.01)
 *B60K 7/00* (2006.01)

(52) U.S. Cl.
 CPC ........ *B60K 7/0007* (2013.01); *H02K 2201/03* (2013.01)

(58) Field of Classification Search
 CPC .... F16C 17/02; F16C 32/048; F16C 32/0644; F16C 32/067; F16H 2200/0021; F16H 57/0476; H02K 21/025; H02K 2201/03; H02K 2213/09; H02K 5/1677; H02K 7/006; H02K 7/088; H02K 7/118; H02K 7/14; H02K 9/19
 See application file for complete search history.

(56) References Cited

U.S. PATENT DOCUMENTS

| | | | |
|---|---|---|---|
| 6,400,522 B1* | 6/2002 | Milligan | G11B 19/2009 360/71 |
| 2008/0030103 A1* | 2/2008 | Neumann | H02N 2/163 310/322 |
| 2019/0093757 A1 | 3/2019 | Remboski et al. | |

FOREIGN PATENT DOCUMENTS

| | | | | |
|---|---|---|---|---|
| DE | 102004063549 A1 | | 8/2005 | |
| DE | 102015207778 A1 | | 11/2016 | |
| DE | 102017209363 A1 | * | 12/2018 | |
| WO | WO-2005074051 A1 | * | 8/2005 | ............. H02N 2/163 |
| WO | WO-2018203798 A1 | * | 11/2018 | ................ B60K 1/00 |

\* cited by examiner

LUBRICANT SUPPORTED ELECTRIC MOTOR WITH A MOVABLE RACEWAY AND AN OPTIMIZED METHOD OF OPERATING SAME

CROSS-REFERENCE TO RELATED APPLICATION

The subject application claims priority to U.S. Provisional Patent Application Ser. No. 62/905,487 filed on Sep. 25, 2019, the entire disclosure of which is incorporated herein by reference.

FIELD OF THE DISCLOSURE

The present disclosure relates generally to a lubricant supported electric motor. More specifically, the present disclosure relates to a lubricant supported electric motor with a movable raceway and an optimized method of operating same.

BACKGROUND OF THE INVENTION

This section provides a general summary of background information and the comments and examples provided in this section are not necessarily prior art to the present disclosure.

Various drivelines in automotive, truck, and certain off-highway applications take power from a central prime mover and distribute the power to the wheels using mechanical devices such as transmissions, transaxles, propeller shafts, and live axles. These configurations work well when the prime mover can be bulky or heavy, such as, for example, various internal combustion engines ("ICE"). However, more attention is being directed towards alternative arrangements of prime movers that provide improved environmental performance, eliminate mechanical driveline components, and result in a lighter-weight vehicle with more space for passengers and payload.

"On wheel", "in-wheel" or "near-wheel" motor configurations are one alternative arrangement for the traditional ICE prime mover that distributes the prime mover function to each or some of the plurality of wheels via one or more motors disposed on, within, or proximate to the plurality of wheels. For example, in one instance, a traction motor, using a central shaft though a rotor and rolling element bearings to support the rotor, can be utilized as the "on wheel", "in wheel" or "near wheel" motor configuration. In another instance, a lubricant supported electric motor, such as described in U.S. application Ser. No. 16/144,002, the disclosure of which is incorporated herein by reference, can be utilized as the "on wheel", "in wheel" or "near wheel" motor configuration. While each of these motor configurations result in a smaller size and lighter weight arrangement as compared to the prime movers based on the internal combustion engine, they each have certain drawbacks and disadvantages.

For example, the utilization of traction motors as the "on wheel", "in wheel" or "near wheel" configuration still results in motors that are too heavy and not robust enough to shock loading to be useful for wheel-end applications. In other words, present traction motors are large, heavy structures supported by rolling element bearings, which are too heavy and large to be practical for wheel end applications. Similarly, the utilization of a lubricant supported electric motors as the "on wheel", "in wheel" or "near wheel" motor in an automotive or land vehicle application results in an arrangement with some performance issues when it is subjected to the wide range of dynamic forces encountered during operation at the wide range of speeds encountered in a prime-mover application. Specifically, the wide range of speeds encountered by the lubricant supported electric motor when utilized in a wheel-end application leads to a number of dynamic effects such as: deflectional critical speeds; torsional critical speeds; torque and translational forces on the rotor related to rotor magnetic pole forces; half-speed load vectors (e.g., due to operation at a speed where the rotor mass imbalance force matches the rotor weight, due to operation where other powertrain equipment creates a ½ order vibration); rotor ½ speed whirl; as well as others. Present arrangements of lubricant supported electric motors are not robust enough to perform well under all these conditions and dynamic forces encountered in a wheel-end motor arrangement. Additionally, present arrangements of lubricant supported electric motors in "on-wheel" applications are not capable of being optimized in real-time to produce the best compromise among these dynamic effects as well as other competing factors such as efficiency, durability, net system power, noise, vibration, and harshness ("NVH"), rotor stability, and others. Accordingly, there remains a need for improvements to "on wheel", "in wheel" or "near wheel" motors, specifically lubricant supported electric motors, which improve performance over the wide range of speeds encountered in a wheel-end prime-mover application and are capable of optimizing performance in real-time, while also providing the lighter and smaller footprint sought from this alternative prime mover implementation.

SUMMARY OF THE INVENTION

The subject invention is generally directed to a lubricant supported electric motor that includes a stator presenting an outer raceway, and a rotor extending along an axis and rotatably disposed within the stator. The rotor presents an inner raceway disposed in spaced relationship with the outer raceway to define a gap therebetween, and a lubricant is disposed in the gap for supporting the rotor within the stator. One of the outer raceway or the inner raceway is movable relative to the other for adjusting the gap between the stator and rotor and optimizing operation and performance of the lubricant supported electric motor in real-time. More specifically, movement of one of the stator or the rotor radially away from or towards the other to adjust the gap between the inner and outer raceways advantageously addresses and overcomes many of the dynamic effects arising when the lubricant supported motor is utilized in a wheel-end application. For example, one of the stator or rotor can be moved radially towards or away from the other during operation based on actual performance characteristics of the lubricant supported electric motor, to adjust the gap between the inner and outer raceways, which correspondingly adjusts the performance characteristics of the lubricant disposed within the gap to help optimize stiffness, control or change the critical speed of the motor for vibration, reduce or control the motor's loss of capacity due to ½ speed load vector effects, and control or change the motor's load capacity over a wider range of operating speeds and dynamic loading situations while maintaining parasitic losses. Thus, the lubricant supported electric motor with a movable inner or outer raceway provides a wheel-end motor that can be optimized in real-time based on actual performance characteristics when disposed in an "on-wheel", "in wheel, or "near wheel" motor configurations, and thus is suitable for the shock loading encountered by wheel-end applications. The lubricant supported electric motor with a movable inner or outer raceway is also light and small, and thus contributes to the overall design strategy for eliminating weight and size from automobiles and land vehicles. Other advantages will be appreciated in view of the following more detailed description of the subject invention.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION OF THE ENABLING EMBODIMENTS

Example embodiments of a lubricant supported electric motor with a movable raceway in accordance with the present disclosure will now be more fully described. Each of these example embodiments are provided so that this disclosure is thorough and fully conveys the scope of the inventive concepts, features and advantages to those skilled in the art. To this end, numerous specific details are set forth such as examples of specific components, devices and mechanisms associated with the lubricant supported electric motor to provide a thorough understanding of each of the embodiments associated with the present disclosure. However, as will be apparent to those skilled in the art, not all specific details described herein need to be employed, the example embodiments may be embodied in many different forms, and thus should not be construed or interpreted to limit the scope of the disclosure.

Figure 1:
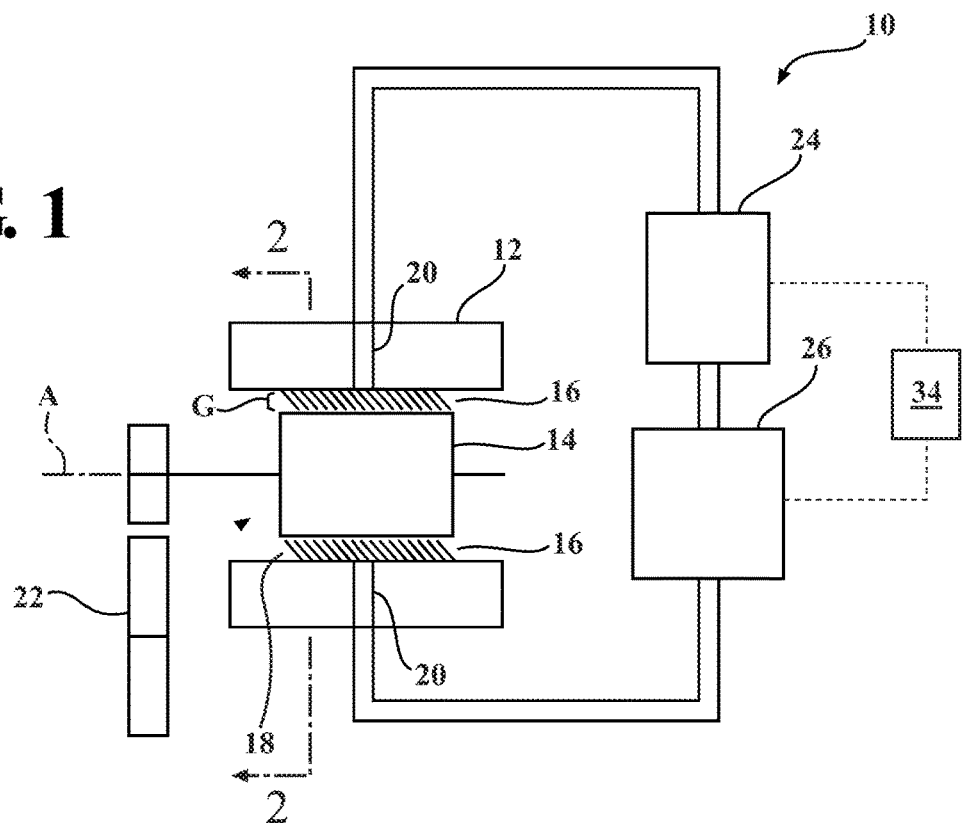
FIG. 1 is a schematic view of a lubricant supported electric motor according to an aspect of the subject disclosure.
Figure 2:
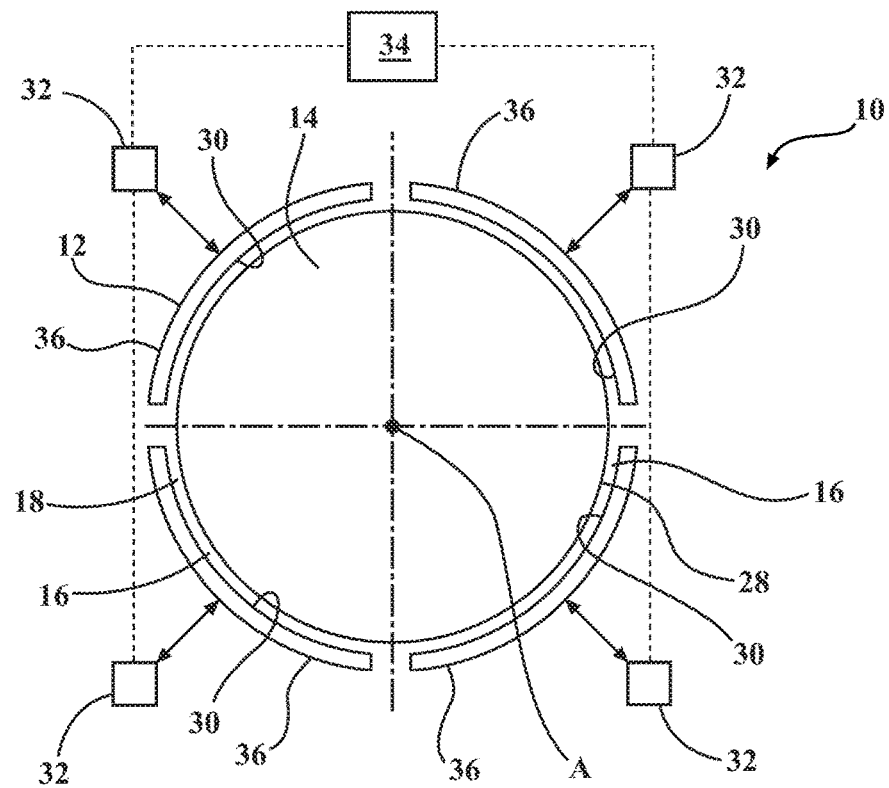
FIG. 2 is a cross-sectional view of the lubricant supporting electric motor taken along line 2-2 of FIG. 1 illustrating a movable raceway presented on the stator and comprised of a plurality of movable stator segments.

FIGS. 1-2 illustrate a lubricant supported electric motor 10 in accordance with an aspect of the disclosure. As best illustrated in FIG. 1, the lubricant supported electric motor 10 includes a stator 12 and a rotor 14 extending along an axis A and rotatably disposed within the stator 12 to define a gap 16 therebetween. A lubricant 18 is disposed in the gap 16 for supporting the rotor 14 within the stator 12, and providing continuous contact between these components. The lubricant 18 may therefore act as a buffer (e.g., suspension) between the rotor 14 and stator 12 minimizing or preventing contact therebetween. In other words, the lubricant 18 prevents direct contact between the stator 12 and rotor 14 and provides a lubricant supported electric motor 10 which is robust to shock and vibration loading due to the presence of the lubricant 18. Additionally, and alternatively, a substantially incompressible lubricant 18 may be used in order to minimize the gap between the stator 12 and rotor 14.

As further illustrated FIG. 1, the stator 12 defines a passageway 20 disposed in fluid communication with the gap 16 for introducing the lubricant 18. However, the passageway 20 could be provided on any other components of the lubricant supported electric motor 10 without departing from the subject disclosure. According to an aspect, the lubricant 18 may be cycled or pumped through the passageway 20 and into the gap 16 in various ways. For example, a high pressure source (e.g., a pump) 24 of the lubricant 18 may be fluidly coupled to a low pressure source (e.g., a sump) 26 of the lubricant 18, where the lubricant 18 may move from the high pressure source to the lower pressure source, through the passageway 20 and into the gap 16. Rotation of the rotor 14 relative to the stator 12 may operate as a self-pump to drive lubricant 18 through the passageway 20 and into the gap 16.

As further illustrated in FIG. 1, the rotor 14 is interconnected to a drive assembly 22 for coupling the lubricant supported electric motor 10 to one of the plurality of wheels of a vehicle. For example, in one instance, the drive assembly 22 may include a planetary gear system. Alternatively, the drive assembly 22 may include one or more parallel axis gears. The stator 12 and rotor 14 are configured to exert an electromagnetic force therebetween to convert electrical energy into mechanical energy, moving the rotor 14 and ultimately driving the wheel coupled to the lubricant supported electric motor 10 via the drive assembly 22. The drive assemblies 20 may provide one or more reduction ratios between the lubricant supported electric motor 10 and the wheel in response to movement of the rotor 14.

As best illustrated in FIG. 2, the rotor 10 presents an inner raceway 28 and the stator 12 presents an outer raceway 30. One of the inner or outer raceways 28, 30 is movable relative to the other to adjust the gap 16 and optimize performance of the lubricant supported electric motor 10 in real-time. For example, the gap 16 between the inner and outer raceways 28, 30 determines a dynamic pressure developed when the lubricant supported electric motor 10 is in hydrodynamic mode. The gap 16 between the inner and outer raceways 28, 30 also determines the pressure in a bearing pocket (clearance area) when the lubricant supported electric motor 10 is in hydrostatic mode. For both of these reasons, and as will be described in more detail below, control of the gap 16 by moving one of the inner or outer raceway 28, 30 relative to the other (i.e., by moving the stator 12 or rotor 14 radially towards or away from the other) results in optimized performance for the lubricant supported electric motor 10.

In a preferred arrangement, the stator 12 is moveable radially towards or away from the rotor 14 to correspondingly move the outer raceway 30 radially towards or away from the inner raceway 28 and adjust the gap 16. At least one actuator 32 is operably coupled to the stator 12 to effectuate this radial movement of the stator 12. For example, the actuator 32 can be a hydraulic actuator which applies or releases a hydraulic pressure to a back or rear portion of the stator 12 to move the stator 12 radially towards or away from the rotor 14. Alternatively, the actuator 32 can be a piezoelectric actuator which applies or releases a piezoelectric force to the back or rear portion of the stator 12. Additionally, the actuator 32 can be a magnetic actuator which applies or releases a magnetic force to the back or rear portion of the stator 12.

In each arrangement of the actuator 32, the radial movement of the stator 12 radially towards or away from the rotor 14 is effectuated in response to a number of different, real-time operational conditions of the lubricant supported electric motor 10. For example, as illustrated in FIG. 2, the lubricant supported electric motor 10 also includes a controller 34 disposed in electrical communication with the actuator 32 and which is also configured to monitor a number of operational conditions of the lubricant supported electric motor 10, including but not limited to:

motor speed;

properties of the lubricant—e.g. viscosity, compressibility (entrained air)

motor static radial load—e.g. rotor weight;

motor dynamic radial load related to rotor angular position—e.g., loading from connected machinery such as gears;

motor dynamic radial load not related to rotor angular position—e.g., external shocks or vibration applied to the lubricant supported electric motor;

stability of the lubricant at a given operating condition—e.g., operation near a critical resonant speed of the stator-lubricant-rotor system (torsional, displacement or ½ speed load vector driven);

load angle of the bearing—angular difference between the peak hydrodynamic force vector and the load vector; and rotor whirl—i.e., where the rotor orbits slightly inside of the stator inner circumference.

The controller 34 is then configured to adjust the gap 16 between the inner and outer raceways 28, 30, such as by actuating the actuator 32 to move the stator 12 radially towards or away from the rotor 14, in response to any or all of these real-time operating conditions of the lubricant supported electric motor 10. As explained in the introductory section, adjustment of the gap 16 between the inner and outer raceways 28, 30 in real-time results in a lubricant supported electric motor 10 that operates to produce correct load capacity, correct stiffness, minimum lubricant shear loss, controlled lubricant stability, and correct rotor stability.

In a preferred arrangement, and as best illustrated in FIG. 2, the stator 12 is comprised of a plurality of stator segments 36 which collectively define the outer raceway 30 and which each can be independently moved radially towards or away from the inner raceway 24 of the rotor 14 to adjust the gap 16. In other words, the outer raceway 30 of the stator 12 is moveable radially towards or away from the inner raceway 28 of the rotor 14 in segmented fashion. Although the plurality of stator segments 36 are illustrated as spanning the entire outer raceway 30 of the stator 12, the plurality of stator segments 36 could also be small, local segments which only cover a smaller subset or portion of the outer raceway 30 without departing from the scope of the subject disclosure. As best illustrated in FIG. 2, the at least one actuator 32 includes a plurality of actuators 32 each associated with one of the stator segments 36 and individually actuatable to move a respective one of the stator segments 36 radially towards or away from the inner raceway 28 of the rotor 14 in individualized fashion.

In an additional embodiment, the operation and performance of the lubricant supported electric motor 10 can also be optimized in real-time by controlling the lubricant 18 supplied to the gap 16 through the passageway 20. For example, a condition of the lubricant 18 supplied to the gap 16 determines the hydrodynamic and hydrostatic properties of the lubricant supported electric motor 10. The characteristics of the lubricant 18 such as pressure, resistance to flow, stiffness of the pressure supply and inertial or flow stabilizing effects determine how the lubricant supported electric motor 10 behaves in operation. Accordingly, as best illustrated in FIG. 1, the controller 34 is disposed in electrical communication with the pump 24 and sump 26 and is also configured to control a condition of the lubricant 18 supplied to the gap 16, and thus to the lubricant supported electric motor 10, using a number of different techniques:

Uniform pressure supply to all of the plurality of stator segments 36 with a low resistance source of lubricant flow through the passageway 20;

Uniform pressure supply to all of the plurality of stator segments 36 with a high resistance source of lubricant flow through the passageway 20;

Non-uniform supply to the outer raceway 30 defined by the plurality of stator segments 36 with variations in lubricant supply pressure and flow resistance on a segment-by-segment basis; and Control of a pressure, flow resistance, supply pressure stiffness, supply inertial factor (analogs of R, C, L) of the lubricant 18 supplied through the passageway 20 to the gap 18.

Thus, as exemplified by the above list, the lubricant 18 may be supplied to the lubricant electric supported motor 10 as a whole, or alternatively can be supplied between select stator segments 36 illustrated in FIG. 2 and their respective portions of the inner raceway 28 of the rotor 14. Lubricant restrictions to flow may take the form of orifices disposed within the passageway 20 creating a choked flow or capillary tubes and thus a surface friction restriction to flow. Pressure stiffness can also be changed using varying sizes of hydraulic accumulators. Supply inertial factors can also be controlled by changing the mass of lubricant 18 flowing in the lubricant supported electric motor 10.

In an additional embodiment, the operation and performance of the lubricant supported electric motor 10 is also optimized in real-time by controlling properties of the lubricant 18 supplied to the gap 16. The properties of the lubricant 18 determine the hydrodynamic, hydrostatic and resonant characteristics of the lubricant supported electric motor 10. The key lubricant properties are viscosity, compressibility and contamination. The lubricant's viscosity is determined by the chemical make-up of the lubricant 18, the lubricant's additive package and the temperature of the lubricant 18. The lubricant's compressibility is primarily a function of the amount of entrained gas present in the lubricant 18. Furthermore, lubricant contamination is controlled by filters, chemical getters and water/oil separators. Accordingly, by way of communication with the pump 24 and sump 26, the controller 34 is also configured to adjust a condition of the lubricant 18 based on operating conditions of the lubricant supported electric motor 10.

The net force on the rotor defines what is called a load vector. This load vector has a direction and a magnitude. In normal operation, the load vector is primarily influenced by the mass of the rotor being pulled down by gravity. In some cases, the load vector can be changed by wheel-end motion or by small imbalances in the magnetic forces that the stator places on the rotor. In an alternative embodiment, the load vector is controlled in such a manner as to improve the hydrodynamic operating range of the lubricant supported electric motor 10. This is accomplished by controlling the load vector's angle relative to the rotor's rotation angle. For example, moving the load vector angle in the same direction as rotation of the rotor 14 at ½ the rotation speed will greatly reduce hydrodynamic bearing pressure. Alternatively, moving the load vector in the opposite direction of the rotor rotation would tend to increase the hydrodynamic pressure. Thus, in an embodiment, the hydrodynamic pressure can be controlled along with the parasitic load developed in the peak hydrodynamic pressure area. For example forces on the rotor can be added or removed by using the actuators 32 in a coordinated fashion. When coordinated in synchronization with the rotor rotational motion, these coordinated motions of the actuators can have the effect of increasing or decreasing the bearing's hydrodynamic pressure, as described above.

Each of the above-mentioned embodiments of controlling the lubricant supported electric motor 10 provide an optimized operation method of the lubricant supported electric motor 10 which produces correct load capacity, correct stiffness, minimum lubricant shear loss, controlled/defined lubricant stability, and correct rotor stability. These operational procedures are model based and learn and adapt based on actual field performance of the lubricant supported electric motor 10. In other words, the techniques described above are dynamic elements of the lubricant supported electric motor 10 which are responsive to real-time operating conditions. In some applications, lubricant supported electric motors may have multiple diameters and multiple hydrostatic and hydrodynamic surfaces.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A lubricant supported electric motor comprising:
a stator presenting an outer raceway;
a rotor extending along an axis and rotatably disposed within said stator;
said rotor presenting an inner raceway disposed in spaced relationship with said outer raceway to define a gap therebetween;
a lubricant disposed in said gap for supporting said rotor within said stator, and
at least one of said outer raceway or said inner raceway movable radially towards or away from the other to adjust said gap and optimize operation of the lubricant supported electric motor.

2. The lubricant supported electric motor as set forth in claim 1, wherein said stator is movable radially towards or away from said rotor to correspondingly adjust said gap between said inner and outer raceways.

3. The lubricant supported electric motor as set forth in claim 2, further comprising an actuator operably coupled to said stator for effectuating said radial movement of said stator.

4. The lubricant supported electric motor as set forth in claim 3, wherein said actuator is comprised of a hydraulic actuator configured to apply or release a hydraulic pressure to said stator to effectuate said radial movement.

5. The lubricant supported electric motor as set forth in claim 3, wherein said actuator is comprised of a piezoelectric actuator configured to apply or release a piezoelectric force to said stator to effectuate said radial movement.

6. The lubricant supported electric motor as set forth in claim 3, wherein said actuator is comprised of a magnetic actuator configured to apply or release a magnetic force to said stator to effectuate said radial movement.

7. The lubricant supported electric motor as set forth in claim 2, wherein said stator is comprised of a plurality of stator segments which collectively define said outer raceway and are independently movable radially towards or away from said inner raceway of said rotor to adjust said gap.

8. The lubricant supported electric motor as set forth in claim 7, further comprising an actuator operably coupled to each of said plurality of stator segments for effectuating said individualized radial movement of said each of said stator segments.

9. A lubricant supported electric motor as set forth in claim 8, further comprising a controller disposed in electrical communication with each of said actuators and configured to monitor at least one operating condition of the lubricant supported electric motor and adjust the gap between the inner and outer raceways in response to said at least one operating condition.

10. The lubricant supported electric motor as set forth in claim 9, wherein said at least one operating condition of the lubricant supported electric motor includes: a speed of the lubricant supported electric motor, a property of said lubricant, a motor static radial load, a motor dynamic radial load related to rotor angular position, a motor dynamic radial load not related to rotor angular position, a load angle of the lubricant supported electric motor, or a rotor whirl.

11. The lubricant supported electric motor as set forth in claim 9, wherein said stator defines a passageway disposed in fluid communication with said gap as well as a high pressure source and a low pressure source of said lubricant, and said controller is disposed in electrical communication with said high and low pressure sources and configured to control a property of said lubricant supplied to said gap based on the operating conditions of the lubricant supported electric motor.

12. The lubricant supported electric motor as set forth in claim 11, wherein said controller is configured to control at least one of a viscosity, a temperature, an additive package, or a compressibility of said lubricant based on the operating conditions of the lubricant supported electric motor.

13. The lubricant supported electric motor as set forth in claim 11, wherein said controller is further configured to adjust a supply of said lubricant to said gap based on the operating conditions of the lubricant supported electric motor.

14. The lubricant supported electric motor as set forth in claim 1, wherein said rotor is operably connected to a final drive device that is interconnected to a wheel of a vehicle.

* * * * *